Patented Sept. 19, 1922.

1,429,586

UNITED STATES PATENT OFFICE.

THOMAS HANNA, DECEASED, LATE OF COLUMBUS, OHIO, BY JOHN W. BRICKER, ADMINISTRATOR, OF COLUMBUS, OHIO, AND ABE M. HANNA, DECEASED, LATE OF COLUMBUS, OHIO, BY LUELLA H. HANNA, EXECUTRIX, OF COLUMBUS, OHIO.

MOLDING MIXTURE.

No Drawing.   Application filed October 2, 1920.  Serial No. 414,348.

*To all whom it may concern:*

Be it known that we, JOHN W. BRICKER and LUELLA H. HANNA, citizens of the United States, residing at Columbus, county of Franklin, and State of Ohio, are administrator of the estate of THOMAS HANNA, late a citizen of Columbus, Ohio, and executrix of the estate of ABE M. HANNA, late a citizen of Columbus, Ohio, respectively, both of whom are deceased, and that the said THOMAS HANNA and ABE M. HANNA did invent jointly certain new and useful Improvements in Molding Mixtures, of which the following is a specification.

This invention relates to the production of a molding mixture based upon the well-known action or hardening effect of the aldehydes on animal extractives or the like, such as, for instance formaldehyde on animal glue.

In making molding mixtures according to our invention, we subject sawdust, wood pulp, clay or any other cheap and suitable filler to a solution of animal extractives, such as glue, prepared by dissolving one pound of glue and seven pounds of water, then boiling preferably in a steam-jacketed pan. Immediately after subjecting the filler or mixing it with the glue solution, we then subject that mixture to, or mix it with an aldehyde solution prepared by adding one pound of commercial formaldehyde to six pounds of water.

After these two liquids have been mixed with a filler, the mass should be thoroughly stirred, so that the liquids are thoroughly distributed among the filler, and also in order that the formaldehyde solution should reach every portion of the mixture, as it is upon the action of the formaldehyde upon the glue that the successful carrying out of this invention can be had.

Instead of subjecting the filling material to two separate treatments, the formaldehyde solution and the glue solution may be mixed together first and the mixture applied in proper proportions to the filler.

After the material so treated has been thoroughly mixed, it should be dried until it has a very stiff consistency, and the molding should be completed within one or two hours, or at the latest three hours, after all of the materials have been brought together.

Parts moulded from this mixture should be compressed in moulds under pressure and without heat, or with very little heat, then dried in the moulds or taken from the moulds and dried, at a temperature of about 90° F.

The molding mixture made as described will be found to be strong, tough and durable, suitable for many mechanical and electrical applications, as it is also a good insulator of electricity.

What is claimed is:—

1. A process of making a molding mixture which consists in mixing a solution of animal glue with formaldehyde, and then mixing a filler into the first-mentioned mixture.

2. A process of making a molding mixture which consists in mixing a solution of animal glue with a substantially equal volume of formaldehyde, and then mixing a filler with said first-mentioned mixture.

In testimony whereof we affix our signatures.

JOHN W. BRICKER,
*Administrator of Thomas Hanna, deceased.*
LUELLA H. HANNA,
*Executrix of Abe M. Hanna, deceased.*